United States Patent
Oba et al.

(10) Patent No.: US 11,214,269 B2
(45) Date of Patent: Jan. 4, 2022

(54) IN-VEHICLE INFORMATION PROCESSING DEVICE, IN-VEHICLE INFORMATION PROCESSING SYSTEM, AND INFORMATION PROCESSING METHOD

(71) Applicant: SONY CORPORATION, Tokyo (JP)

(72) Inventors: Eiji Oba, Tokyo (JP); Tomonori Agawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 362 days.

(21) Appl. No.: 16/300,996

(22) PCT Filed: May 9, 2017

(86) PCT No.: PCT/JP2017/017530
§ 371 (c)(1),
(2) Date: Nov. 13, 2018

(87) PCT Pub. No.: WO2017/203970
PCT Pub. Date: Nov. 30, 2017

(65) Prior Publication Data
US 2020/0317213 A1 Oct. 8, 2020

(30) Foreign Application Priority Data
May 24, 2016 (JP) .............................. JP2016-103106

(51) Int. Cl.
*B60W 50/02* (2012.01)
*B60K 35/00* (2006.01)

(52) U.S. Cl.
CPC ......... *B60W 50/0205* (2013.01); *B60K 35/00* (2013.01); *B60K 2370/21* (2019.05);
(Continued)

(58) Field of Classification Search
None
See application file for complete search history.

(56) References Cited

U.S. PATENT DOCUMENTS

| 2002/0003571 A1* | 1/2002 | Schofield ............ B60R 11/0235 348/148 |
| 2006/0034487 A1* | 2/2006 | Franz ................... H04N 13/239 382/104 |

(Continued)

FOREIGN PATENT DOCUMENTS

| JP | 2004-249836 A | 9/2004 |
| JP | 2007-145241 A | 6/2007 |

(Continued)

OTHER PUBLICATIONS

International Search Report and Written Opinion of PCT Application No. PCT/JP2017/017530, dated Aug. 1, 2017, 02 pages of English Translation and 06 pages of ISRWO.

*Primary Examiner* — Tamara L Weber
(74) *Attorney, Agent, or Firm* — Chip Law Group

(57) ABSTRACT

An in-vehicle information processing device according to an embodiment of the present technology includes a control unit. The control unit detects presence or absence of an abnormality of a first monitor that displays a first image captured by a first camera among a plurality of cameras that capture an image of a predetermined region including a rear side of a vehicle, and switches, when detecting the abnormality of the first monitor, from a first mode in which the first image is displayed on the first monitor to a second mode in which the first image is displayed on a second monitor different from the first monitor.

14 Claims, 10 Drawing Sheets

(52) U.S. Cl.
CPC .. *B60K 2370/95* (2019.05); *B60W 2050/0215* (2013.01); *B60W 2420/42* (2013.01)

(56) References Cited

U.S. PATENT DOCUMENTS

| | | | |
|---|---|---|---|
| 2010/0208073 A1 | 8/2010 | Hattori | |
| 2010/0208074 A1* | 8/2010 | Hattori | B60Q 1/50 348/148 |
| 2013/0088596 A1 | 4/2013 | Raita et al. | |
| 2018/0103185 A1* | 4/2018 | Kim | H04N 5/2258 |

FOREIGN PATENT DOCUMENTS

| | | |
|---|---|---|
| JP | 2010-188902 A | 9/2010 |
| JP | 2011-057015 A | 3/2011 |
| JP | 2011-111028 A | 6/2011 |
| JP | 2011-188134 A | 9/2011 |
| JP | 2012-089985 A | 5/2012 |
| JP | 2014-061808 A | 4/2014 |
| JP | 2016-074290 A | 5/2016 |

\* cited by examiner

IN-VEHICLE INFORMATION PROCESSING DEVICE, IN-VEHICLE INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2017/017530 filed on May 9, 2017, which claims priority benefit of Japanese Patent Application No. JP 2016-103106 filed in the Japan Patent Office on May 24, 2016. Each of the above-referenced applications is hereby incorporated herein by reference in its entirety.

TECHNICAL FIELD

The present technology relates to an in-vehicle information processing device attached to a vehicle, an in-vehicle information processing system, an information processing method, and a program.

BACKGROUND ART

Conventionally, as means for ensuring the visibility of the rear side of a vehicle when a driver operates a vehicle such as an automobile, a room mirror or a side mirror is installed in the vehicle.

In recent years, as means substituting for such a room mirror or a side mirror, it has been expected that a CMS (Camera Monitor System) for displaying an image of the rear side of a vehicle captured by a camera on a monitor becomes pervasive (for example, Patent Literature 1).

CITATION LIST

Patent Literature

Patent Literature 1: Japanese Patent Application Laid-open No. 2014-061808

DISCLOSURE OF INVENTION

Technical Problem

However, a technology described in Patent Literature 1 is a technology adaptable to a case in which a camera that captures an image of the rear side of a vehicle breaks down. Meanwhile, the technology does not assume a case in which an abnormality occurs in a monitor, and thus cannot cope with the case.

In view of the above circumstances, the present technology has an object of providing an in-vehicle information processing device capable of coping with a case in which an abnormality occurs in a monitor that displays an image of the rear side of a vehicle captured by a camera, an in-vehicle information processing system, an information processing method, and a program.

Solution to Problem

In order to achieve the above object, an in-vehicle information processing device according to an embodiment of the technology includes a control unit.

The control unit detects presence or absence of an abnormality of a first monitor that displays a first image captured by a first camera among a plurality of cameras that capture an image of a predetermined region including a rear side of a vehicle, and switches, when detecting the abnormality of the first monitor, from a first mode in which the first image is displayed on the first monitor to a second mode in which the first image is displayed on a second monitor different from the first monitor.

According to the configuration, a user can reliably confirm the rear side and the rear lateral side of a vehicle on the second monitor instead of the first monitor. Accordingly, even if an abnormality occurs in the first monitor, the first image can be presented to the user via the second monitor. Thus, it becomes possible for the user to have the temporary substitute means until the first monitor with the abnormality is replaced.

Thus, according to the present technology, the in-vehicle information processing device capable of coping with a case in which an abnormality occurs in a monitor that displays an image of the rear side of a vehicle captured by a camera can be provided.

The control unit may further generate monitor abnormality alert information informing the abnormality of the first monitor.

Thus, the first image and the monitor abnormality alert information are displayed on, for example, the second monitor in an overlapped state, whereby the user can be effectively alerted to the occurrence of the abnormality in the first monitor.

The control unit may further generate camera abnormality alert information on the basis of an abnormality of the first camera, the camera abnormality alert information informing the abnormality of the first camera on the first monitor in the first mode and informing the abnormality of the first camera on the second monitor in the second mode.

Thus, the first image and the camera abnormality alert information are displayed on the first monitor in the first mode in an overlapped state, and displayed on the second monitor in an overlapped state in the second mode. Accordingly, the user can be effectively alerted to the occurrence of the abnormality in the first camera in both the first mode and the second mode.

The control unit may switch from the first mode to the second mode on the basis of an input operation by a user.

Thus, it becomes possible to switch from the first mode to the second mode according to a user's will.

In order to achieve the above object, an in-vehicle information processing system according to an embodiment of the present technology includes a plurality of cameras, a plurality of monitors, and a control unit.

The plurality of cameras capture an image of a predetermined region including a rear side of a vehicle.

The plurality of monitors display images captured by the plurality of cameras.

The control unit detects presence or absence of an abnormality of a first monitor that displays a first image captured by a first camera among the plurality of cameras, and switches, when detecting the abnormality of the first monitor, from a first mode in which the first image is displayed on the first monitor to a second mode in which the first image is displayed on a second monitor different from the first monitor.

According to the configuration, a user can reliably confirm the first image on the second monitor instead of the first monitor with the control of the control unit. Accordingly, even if an abnormality occurs in the first monitor, the first image can be presented to the user via the second monitor.

Thus, it becomes possible for the user to have the temporary substitute means until the first monitor with the abnormality is replaced.

Thus, according to the above technology, the in-vehicle information processing system capable of coping with a case in which an abnormality occurs in a monitor that displays an image of the rear side of a vehicle captured by a camera can be provided.

The first camera may have first and second input/output systems that capture the image of the predetermined region including the rear side of the vehicle, and a camera control unit including an input/output abnormality detection section that detects an abnormality of the first input/output system and a camera output switching section that switches image input/output systems of the first camera from the first input/output system to the second input/output system.

Thus, it becomes possible to capture an image of the rear side and the rear lateral side of a vehicle with the second input/output system instead of the first input/output system. Therefore, the reliability of a camera system in capturing an image of the rear side and the rear lateral side of a vehicle can be improved.

The control unit may generate monitor abnormality alert information and camera abnormality alert information, the monitor abnormality alert information informing the abnormality of the first monitor on the second monitor in the second mode, the camera abnormality alert information informing an abnormality of the first camera on the second monitor in the second mode on the basis of the abnormality of the first camera, and the plurality of monitors may display the monitor abnormality alert information and the camera abnormality alert information as a symbol mark.

According to the configuration, when abnormalities occur in the first camera and the first monitor that displays an image captured by the first camera, the image, the monitor abnormality alert information, and the camera abnormality alert information are displayed on the second monitor in an overlapped state. Thus, it becomes possible to alert the user to the abnormalities of a camera and a monitor at the same time.

The plurality of monitors may include a first image capturing region in which a part of the vehicle is displayed and a second image capturing region in which an outside of the vehicle other than the part of the vehicle is displayed, and display the symbol mark in the second image capturing region.

Thus, it becomes possible to improve the visibility of alert information for the user.

The symbol mark may be a mark that does not include a text.

Thus, the users of various nationalities can be alerted to the abnormalities of the plurality of cameras and the plurality of monitors.

The in-vehicle information processing system may further include:

a support member that is provided to be freely attachable/detachable to/from a vehicle body, supports the first camera and the first monitor, and has a joint connected to the first monitor.

The first monitor may be configured to be freely rotatable about at least an axis around the joint.

Thus, the user can reliably confirm an image of the rear side and the rear lateral side of a vehicle captured by the first monitor regardless of a place at which the support member is installed.

The in-vehicle information processing system may further include: a user input unit that causes the control unit to switch from the first mode to the second mode on the basis of an input operation by a user.

Thus, it becomes possible to switch from the first mode to the second mode according to a user's will.

The second monitor may be any of a room mirror substitute monitor, a side mirror substitute monitor, a navigation monitor, a center console monitor, and a meter panel.

In order to achieve the above object, an information processing method according to an embodiment of the present technology includes: detecting presence or absence of an abnormality of a first monitor that displays a first image captured by a first camera among a plurality of cameras that capture an image of a predetermined region including a rear side of a vehicle.

When the abnormality of the first monitor is detected, a first mode in which the first image is displayed on the first monitor is switched to a second mode in which the first image is displayed on a second monitor different from the first monitor.

In order to achieve the above object, a program according to an embodiment of the present technology causes an in-vehicle information processing device to perform:

a step of detecting presence or absence of an abnormality of a first monitor that displays a first image captured by a first camera among a plurality of cameras that capture an image of a predetermined region including a rear side of a vehicle; and a step of switching, when detecting the abnormality of the first monitor, from a first mode in which the first image is displayed on the first monitor to a second mode in which the first image is displayed on a second monitor different from the first monitor.

Advantageous Effects of Invention

As described above, according to the present technology, it is possible to provide an in-vehicle information processing device capable of coping with a case in which an abnormality occurs in a monitor that displays an image of the rear side of a vehicle captured by a camera, an in-vehicle information processing system, an information processing method, and a program. Note that the above effects are not necessarily limitative, but any effect described in the present specification or other effects that can be grasped from the present specification may be produced together with or instead of the above effects.

MODE(S) FOR CARRYING OUT THE INVENTION

Hereinafter, embodiments according to the present technology will be described with reference to the drawings.

First Embodiment

[Outline of In-Vehicle Information Processing System]

Figure 1:
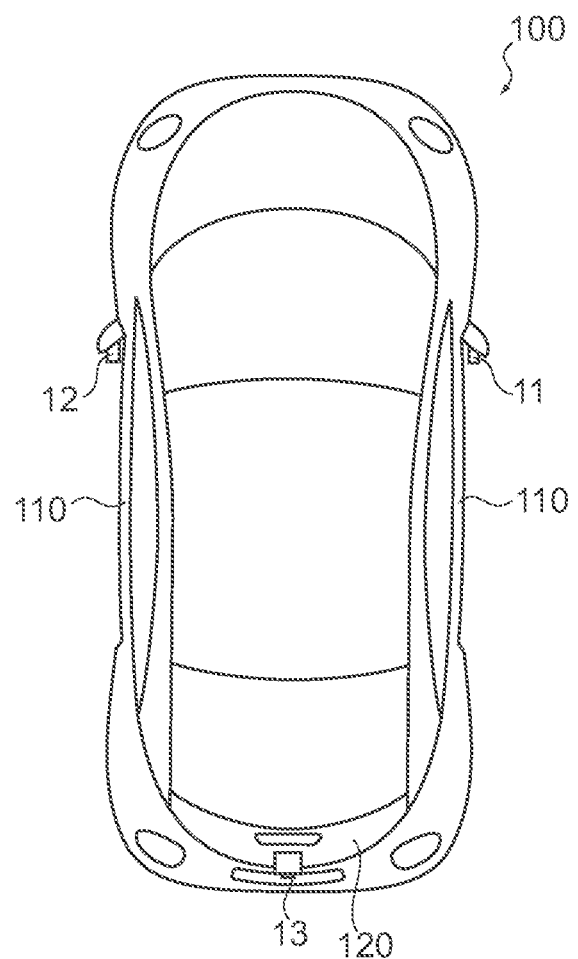
FIG. 1 is a schematic view showing a configuration example of an automobile as an example of a vehicle in which an in-vehicle information processing system according to an embodiment of the present technology is installed.
Figure 2:
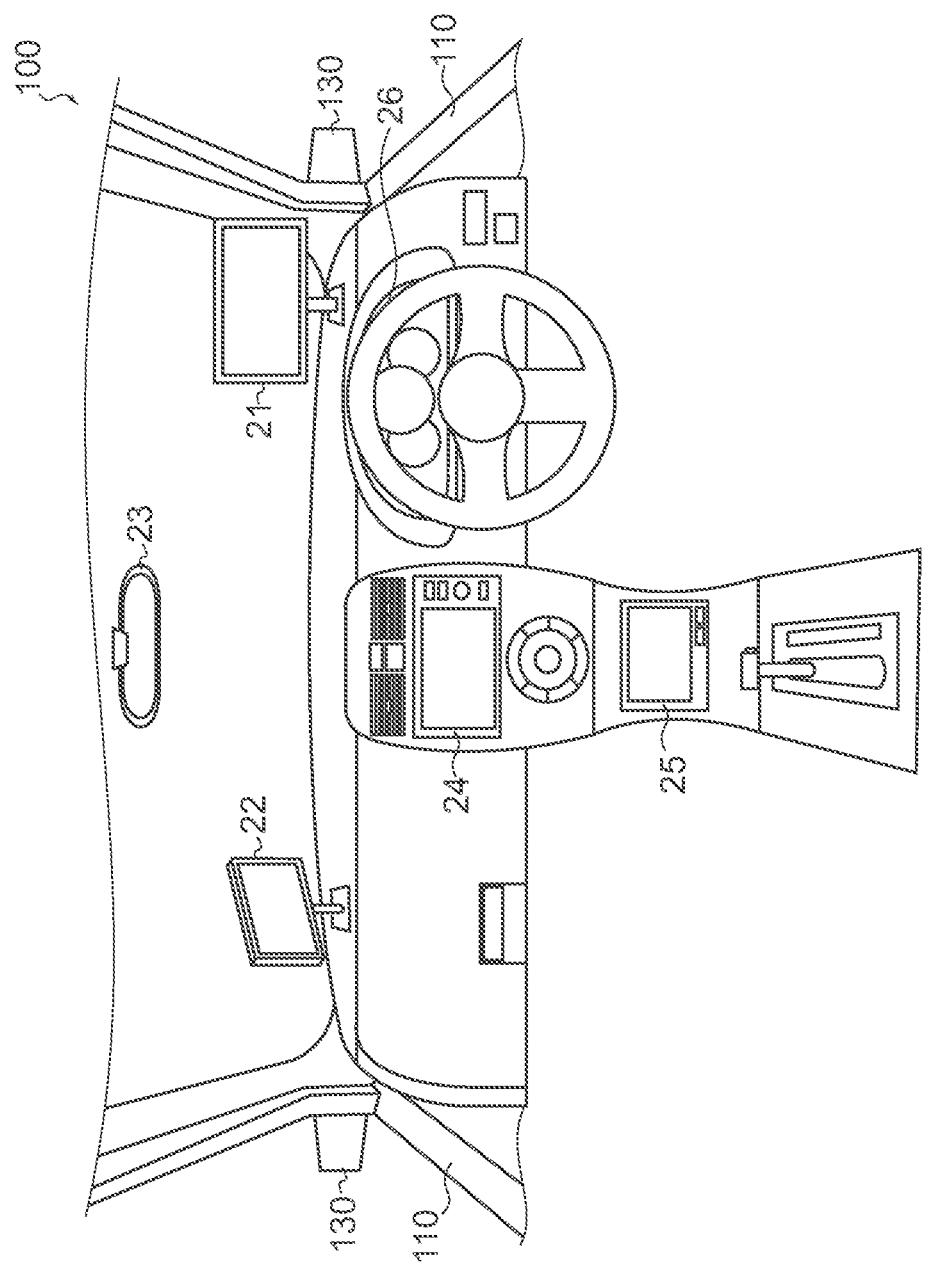
FIG. 2 is a schematic view showing the interior of the automobile.
Figure 3:
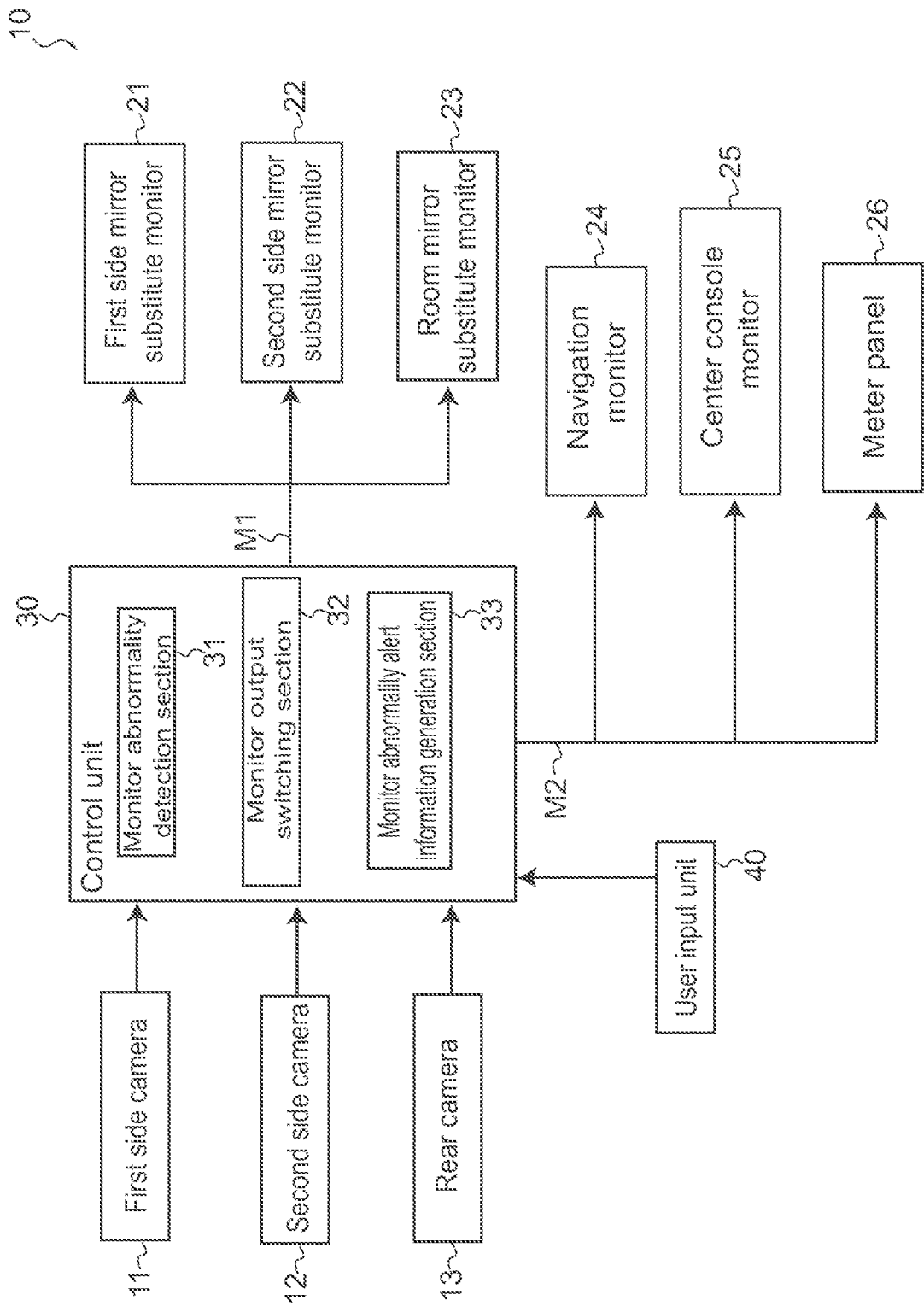
FIG. 3 is a function block diagram showing a configuration example of the in-vehicle information processing system.

FIG. 1 is a schematic view showing a configuration example of an automobile 100 as an example of a vehicle in which an in-vehicle information processing system according to the present embodiment is installed. FIG. 2 is a schematic view showing the interior of the automobile 100. In addition, FIG. 3 is a function block diagram showing a configuration example of an in-vehicle information processing system 10. Note that the configurations of the in-vehicle information processing system 10 and the automobile 100 are not limited to configurations shown in the drawings that will be referred to in the following descriptions.

The in-vehicle information processing system 10 according to the present embodiment can be, for example, a camera monitor system substituting for a rear view mirror such as a side mirror and a room mirror of the automobile 100. As shown in FIGS. 1 to 3, the in-vehicle information processing system 10 includes a plurality of cameras, a plurality of monitors, a control unit 30, and a user input unit 40.

(Plurality of Cameras)

As shown in FIG. 1, the plurality of cameras provided in the automobile 100 include first and second side cameras 11 and 12 and a rear camera 13.

The first side camera 11 is provided on the driver's seat side of the automobile 100 as shown in FIG. 1, and electrically connected to the control unit 30 in a wired or wireless fashion. In addition, the first side camera 11 is configured to be capable of capturing an image of the rear side and the rear lateral side of the vehicle of the automobile 100.

Figure 4:
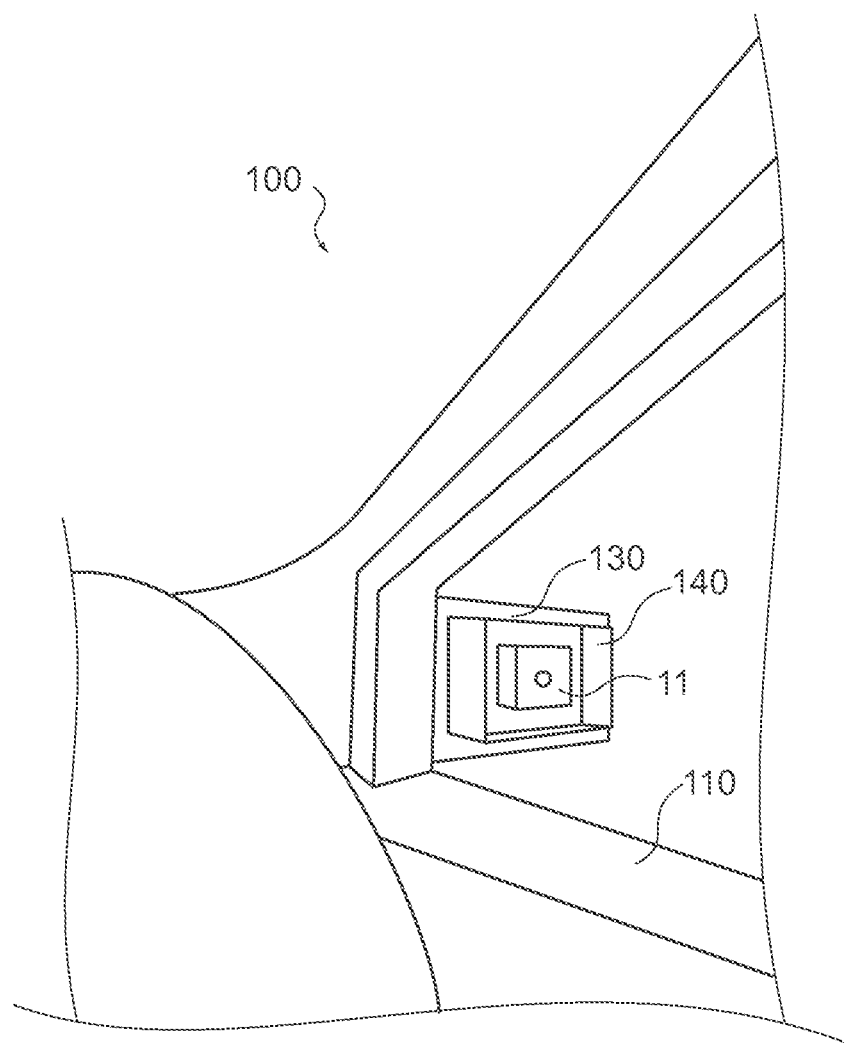
FIG. 4 is a schematic view in which the outside of the vehicle is seen from the driver's seat side of the automobile.

FIG. 4 is a schematic view in which the outside of the vehicle is seen from the driver's seat side of the automobile 100. As shown in the figure, the first side camera 11 according to the present embodiment is supported by a support member 130 that protrudes from a front door 110 on the driver's seat side of the automobile 100 to the outside of the vehicle.

The support member 130 supports a frame body 140 that protrudes from the support member 130 to the rear side of the vehicle and the first side camera 11. Here, the first side camera 11 is configured to be surrounded by the frame body 140 as shown in FIG. 4. Thus, the attachment of rain drops, foreign matter, or the like to the lens of the first side camera 11 can be prevented. In a case in which the automobile 100 is configured to include a side mirror, the first side camera 11 may be directly provided in the side mirror.

Except that the second side camera 12 is provided on an assistant driver's seat side as shown in FIG. 1, the second side camera 12 has typically the same configuration as that of the first side camera 11 described above. In addition, the type of the second side camera 12 may be the same as or different from that of the first side camera 11.

The rear camera 13 is provided in a rear door 120 of the automobile 100 as shown in FIG. 1, a roof part, a high mount brake lamp, a cars cabin in a range near a rear windshield wiper, or a rear bumper, and electrically connected to the control unit 30 in a wired or wireless fashion. In addition, the rear camera 13 is configured to be capable of capturing an image of the rear side of the vehicle of the automobile 100.

In addition, the type of the rear camera 13 may be the same as or different from those of the first and second side cameras 11 and 12. Note that the first and second side cameras 11 and 12 and the rear camera 13 in FIG. 1 are shown larger than their actual sizes for the sake of convenience.

(Plurality of Monitors)

As shown in FIGS. 2 and 3, the plurality of monitors provided in the automobile 100 include a first side mirror substitute monitor 21, a second side mirror substitute monitor 22, a room mirror substitute monitor 23, a navigation monitor 24, a center console monitor 25, and a meter panel 26. These monitors are electrically connected to the control unit 30 in a wired or wireless fashion, and configured to be capable of displaying an image received from the control unit 30 thereon. Each of the above plurality of monitors may be configured to be attachable/detachable to/from the body of the vehicle.

The first side mirror substitute monitor 21 is arranged at a position near the front door 110 on the driver's seat side in which the first side camera 11 is provided, and is, for example, a display device using a liquid crystal, an organic EL (Electroluminescence), or the like.

In addition, the first side mirror substitute monitor 21 is configured to be capable of receiving images captured by the plurality of cameras 11, 12, and 13 from the control unit 30 and displaying the received images. Moreover, the first side mirror substitute monitor 21 is configured to be capable of displaying images obtained by applying image processing to the images, various function buttons, or the like.

Here, the first side mirror substitute monitor 21 according to the present embodiment preferentially receives an image output from the first side camera 11 among the plurality of cameras 11, 12, and 13 with the control of the control unit 30. Thus, the first side mirror substitute monitor 21 has the function of substituting for a side mirror that takes a picture of mainly the rear side and the rear lateral side of the automobile 100 on the driver's seat side.

The second side mirror substitute monitor 22 is arranged at a position near the front door 110 on the assistant driver's seat side in which the second side camera 12 is provided, and is, for example, a display device using a liquid crystal, an organic EL, or the like.

In addition, the second side mirror substitute monitor 22 is configured to be capable of receiving images captured by the plurality of cameras 11, 12, and 13 from the control unit 30 and displaying the received images. Moreover, the second side mirror substitute monitor 22 is configured to be capable of displaying images obtained by applying image processing to the images, various function buttons, or the like.

Here, the second side mirror substitute monitor 22 according to the present embodiment preferentially receives an image generated by the second side camera 12 among the plurality of cameras 11, 12, and 13 with the control of the control unit 30. Thus, the second side mirror substitute monitor 22 has the function of substituting for a side mirror that takes a picture of mainly the rear side and the rear lateral side of the automobile 100 on the assistant driver's seat side.

The type of the second side mirror substitute monitor 22 may be the same as or different from that of the first side mirror substitute monitor 21.

The room mirror substitute monitor 23 is typically attached to the windshield or the ceiling of the automobile 100 inside the vehicle.

The room mirror substitute monitor 23 is, for example, a display device using a liquid crystal, an organic EL, or the like, and configured to be capable of receiving images generated by the plurality of cameras 11, 12, and 13 from the control unit 30 and displaying the received images. In addition, the room mirror substitute monitor 23 is configured to be capable of displaying images obtained by applying image processing to the images, various function buttons, or the like.

Here, the room mirror substitute monitor 23 according to the present embodiment preferentially receives an image generated by the rear camera 13 among the plurality of cameras 11, 12, and 13 with the control of the control unit 30. Thus, the room mirror substitute monitor 23 has the function of substituting for a room mirror that takes a picture of mainly the rear side of the automobile 100. Note that the type of the room mirror substitute monitor 23 may be the same as or different from those of the first and second side mirror substitute monitors 21 and 22. In addition, the room mirror substitute monitor 23 may be configured to arbitrarily switch between a monitor and a mirror.

The navigation monitor 24, the center console monitor 25, and the meter panel 26 are electrically connected to the control unit 30, and configured to be capable of receiving images generated by the plurality of cameras 11, 12, and 13 from the control unit 30 and displaying the received images.

The navigation monitor 24 is typically a car navigation device, and displays map information, navigation information, or the like.

The center console monitor 25 is a monitor attached to the center console of the automobile 100, and is an integrated control panel with which the temperature of an air conditioner, the volume of an audio system, or the like is controlled. The meter panel 26 is a panel that displays mainly the speed information of the automobile 100. Note that the meter panel 26 may be configured to be attachable/detachable to/from the automobile 100.

(Control Unit)

The control unit 30 according to the present embodiment is typically an ECU (Electronic Control Unit) installed in the automobile 100, and configured to be capable of receiving images output from the plurality of cameras 11, 12, and 13 and outputting the images to the plurality of monitors 21, 22, and 23, the navigation monitor 24, the center console monitor 25, and the meter panel 26.

The control unit 30 corresponds to an in-vehicle information processing device according to the present embodiment, and includes hardware necessary for a computer such as a CPU (Central Processing Unit), a RAM (Random Access Memory), and a ROM (Read Only Memory). An information processing method according to the present technology is performed when the CPU loads a program according to the present technology recorded on the ROM in advance into the RAM to be performed.

As shown in FIG. 3, the control unit 30 includes a monitor abnormality detection section 31, a monitor output switching section 32, and a monitor abnormality alert information generation section 33. By performing, for example, the above program recorded on the ROM, the control unit 30 realizes functions as the monitor abnormality detection section 31, the monitor output switching section 32, and the monitor abnormality alert information generation section 33 and performs processing for controlling the entirety of the in-vehicle information processing system 10 and processing for switching modes that will be described later, or the like.

The monitor abnormality detection section 31 is configured to be capable of detecting the presence or absence of the abnormalities of the monitors (such as a tone malfunction, a brightness malfunction, a setting malfunction (uncalibrated), and non-display of images) on the basis of, for example, the abnormalities of the current values of the plurality of monitors 21, 22, and 23, or the like. Alternatively, the monitor abnormality detection section 31 may perform the detection by simply detecting an external manual operation by a driver. That is, the detection of the presence or absence of the abnormalities of the plurality of monitors 21, 22, and 23 is not limited to automatic detection, but may be performed when the driver recognizes malfunctions and instructs operations associated with the malfunctions.

The monitor output switching section 32 is configured to be capable of switching the image output systems in the in-vehicle information processing system 10 on the basis of the detection results of the monitor abnormality detection section 31. In addition, the monitor output switching section 32 is also capable of switching the output systems based on a user's input operation.

The monitor abnormality alert information generation section 33 generates monitor abnormality alert information indicating which of the plurality of monitors 21, 22, and 23 has caused an abnormality on the basis of the detection results of the monitor abnormality detection section 31. The monitor abnormality alert information generation section 33 is configured to be capable of outputting the generated monitor abnormality alert information to the navigation monitor 24, the center console monitor 25, and the meter panel 26.

(User Input Unit)

The user input unit 40 is electrically connected to the control unit 30, and constituted by various buttons, touch panels displayed on the display screens of the plurality of monitors 21, 22, and 23, or the like. Thus, by operating the user input unit 40, a user is allowed to perform desired processing such as the switching of the output systems of the in-vehicle information processing system 10 described above and the designation of the visual field angle ranges of the plurality of cameras 11, 12, and 13.

The in-vehicle information processing system 10 according to the present technology includes the configurations as described above.

[Information Processing Method]

Figure 5:
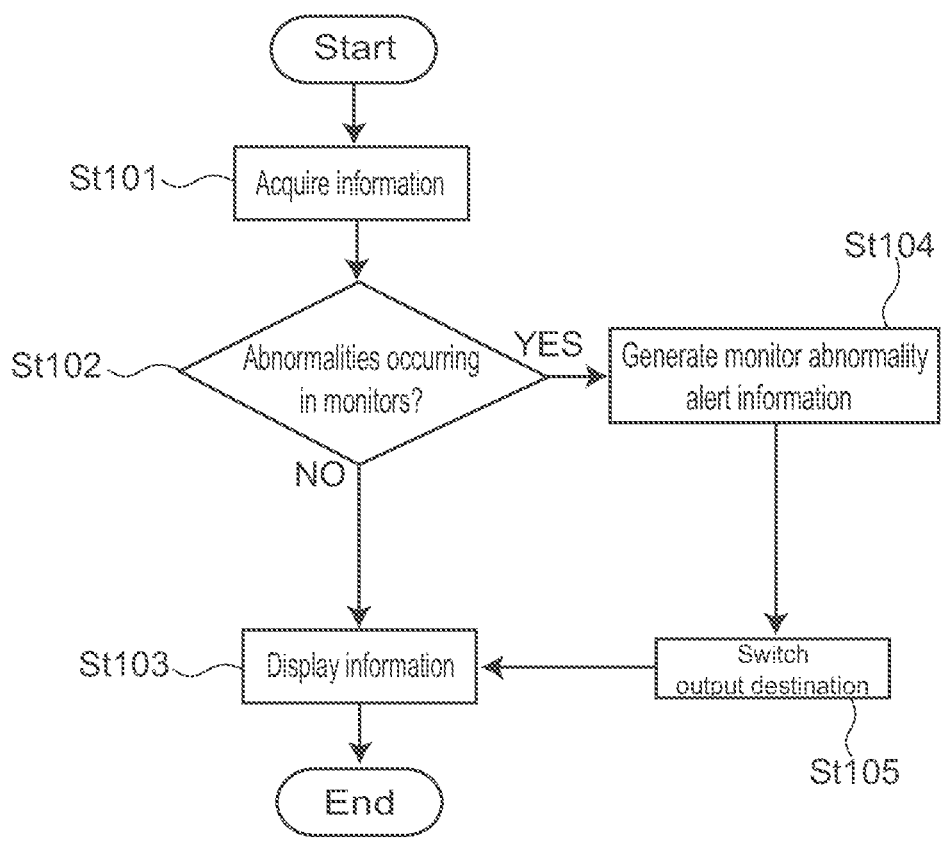
FIG. 5 is a flowchart showing an example of the information processing method of the in-vehicle information processing device according to the embodiment of the present technology.

Next, the information processing method of the control unit 30 will be described. FIG. 5 is a flowchart showing an example of the information processing method of the control unit 30.

The control unit 30 according to the present embodiment performs control to switch from a "normal mode M1" in which images are normally displayed on the plurality of monitors 21, 22, and 23 to an "abnormality detection mode M2" in which an output system different from that of the normal mode M1 is used. Hereinafter, the information processing method of the control unit 30 will be described with reference to FIG. 5.

(Normal Mode)

First, as shown in FIG. 5, the control unit 30 acquires control information (images or the like) from the plurality of cameras 11, 12, and 13 (St101). Next, the monitor abnormality detection section 31 detects the presence or absence of the abnormalities of the plurality of monitors 21, 22, and 23 (St102).

Then, when the monitor abnormality detection section 31 does not detect the abnormalities of the plurality of monitors 21, 22, and 23 (NO in St102), the control unit 30 outputs the acquired images to the plurality of monitors 21, 22, and 23 to be displayed thereon (St103). Here, the control unit 30 in the normal mode M1 outputs the images acquired from the plurality of cameras 11, 12, and 13 to the plurality of monitors 21, 22, and 23 corresponding to the plurality of cameras 11, 12, and 13, respectively.

Specifically, the control unit 30 in the normal mode M1 outputs the image acquired from the first side camera 11, the image acquired from the second side camera 12, and the image acquired from the rear camera 13 to the first side mirror substitute monitor 21, the second side mirror substitute monitor 22, and the room mirror substitute monitor 23, respectively.

(Abnormality Detection Mode)

First, the control unit 30 acquires control information (images or the like) from the plurality of cameras 11, 12, and 13 like the normal mode M1 (St101), and the monitor abnormality detection section 31 detects the presence or absence of the abnormalities of the plurality of monitors 21, 22, and 23 (St102).

Then, when the monitor abnormality detection section 31 detects the abnormality of any of the plurality of monitors 21, 22, and 23 (YES in St102), the monitor abnormality alert information generation section 33 generates monitor abnormality alert information (St104). Note that the monitor abnormality detection section 31 is also capable of detecting the abnormality of any of the plurality of monitors 21, 22, and 23 and determining whether the output of an image to the monitor is allowed.

Next, the monitor output switching section 32 outputs the images acquired from the plurality of cameras 11, 12, and 13 and the monitor abnormality alert information to a monitor other than the plurality of monitors 21, 22, and 23 on the basis of the detection result of the monitor abnormality detection section 31.

Thus, the normal mode M1 in which the images acquired by the plurality of cameras 11, 12, and 13 are displayed on the plurality of monitors 21, 22, and 23, respectively, is switched to the abnormality detection mode M2 in which the images are displayed on any of monitors (any of the navigation monitor 24, the center console monitor 25, and the meter panel 26) other than the plurality of monitors 21, 22, and 23 (St105), whereby the images are displayed on the new output destinations (St103).

Specifically, for example, when an abnormality occurs in the first side mirror substitute monitor 21, the above monitor abnormality alert information and an image acquired from the first side camera 11 corresponding to the first side mirror substitute monitor 21 are output to any of the navigation monitor 24, the center console monitor 25, and the meter panel 26. The image captured by the first side camera 11 and the monitor abnormality alert information are displayed on such a display device in an overlapped state.

[Operation of In-Vehicle Information Processing System]

Next, the operation of the in-vehicle information processing system 10 according to the present embodiment will be described.

In recent years, the use of in-vehicle monitor systems has been advanced in vehicles such as automobiles, and the development of CMS (Camera Monitor Systems) substituting for the functions of in-vehicle mirrors has been performed.

With the realization of such a technology, the attachment of mirrors to vehicles becomes unnecessary. Therefore, in addition to an increase in the degree of the freedom of vehicle styling, it becomes possible to realize an increase in fuel economy with an improvement in the aerodynamics of the vehicles, an improvement in visibility with a decrease in dead angle, or the like.

Meanwhile, there have been some concerns about the use of such CMS. Particularly, there has been a problem in that knowledge capable of coping with cases in which abnormalities occur in monitors substituting for rear view mirrors such as side mirrors and room mirrors has not been substantially obtained.

In order to solve the problem, the in-vehicle information processing system 10 according to the present embodiment can display, as described above, when an abnormality occurs in any of the plurality of monitors 21, 22, and 23 substituting for the rear view mirrors of the automobile 100, an image to be displayed on the monitor on any of the monitors 24, 25, and 26 other than the monitors substituting for the rear view mirrors.

Thus, even if an abnormality occurs in any of the monitor 21, 22, and 23 substituting for the rear view mirrors and the display of an image on the monitor is not allowed, the rear side and the rear lateral side of the automobile 100 can be reliably confirmed by any of the monitors 24, 25, and 26 other than the monitors substituting for the rear view mirrors.

That is, even if an abnormality occurs in any of the monitor 21, 22, and 23 substituting for the rear view mirrors, the rear side and the rear lateral side of the automobile 100 can be presented to the user via any of the monitor 24, 25, and 26 other than the monitors substituting for the rear view mirrors, whereby it becomes possible for the user to have the temporary substitute means until any of the monitor 21, 22, and 23 with the abnormality is replaced.

In addition, the in-vehicle information processing system 10 can display, in an overlapped state, an image to be displayed on any of the monitor 21, 22, and 23 substituting for the rear view mirrors and monitor abnormality alert information for causing the user to recognize the abnormality of the monitor on any of the monitor 24, 25, and 26 that do not originally have the function of substituting for the rear view mirrors. Thus, it becomes possible to effectively alert the user to the occurrence of an abnormality in a monitor to urge the early replacement of the monitor and prevent the prolongation of a state in which the abnormality has occurred in the monitor.

Second Embodiment

[Configuration of In-Vehicle Information Processing System]

Figure 6:
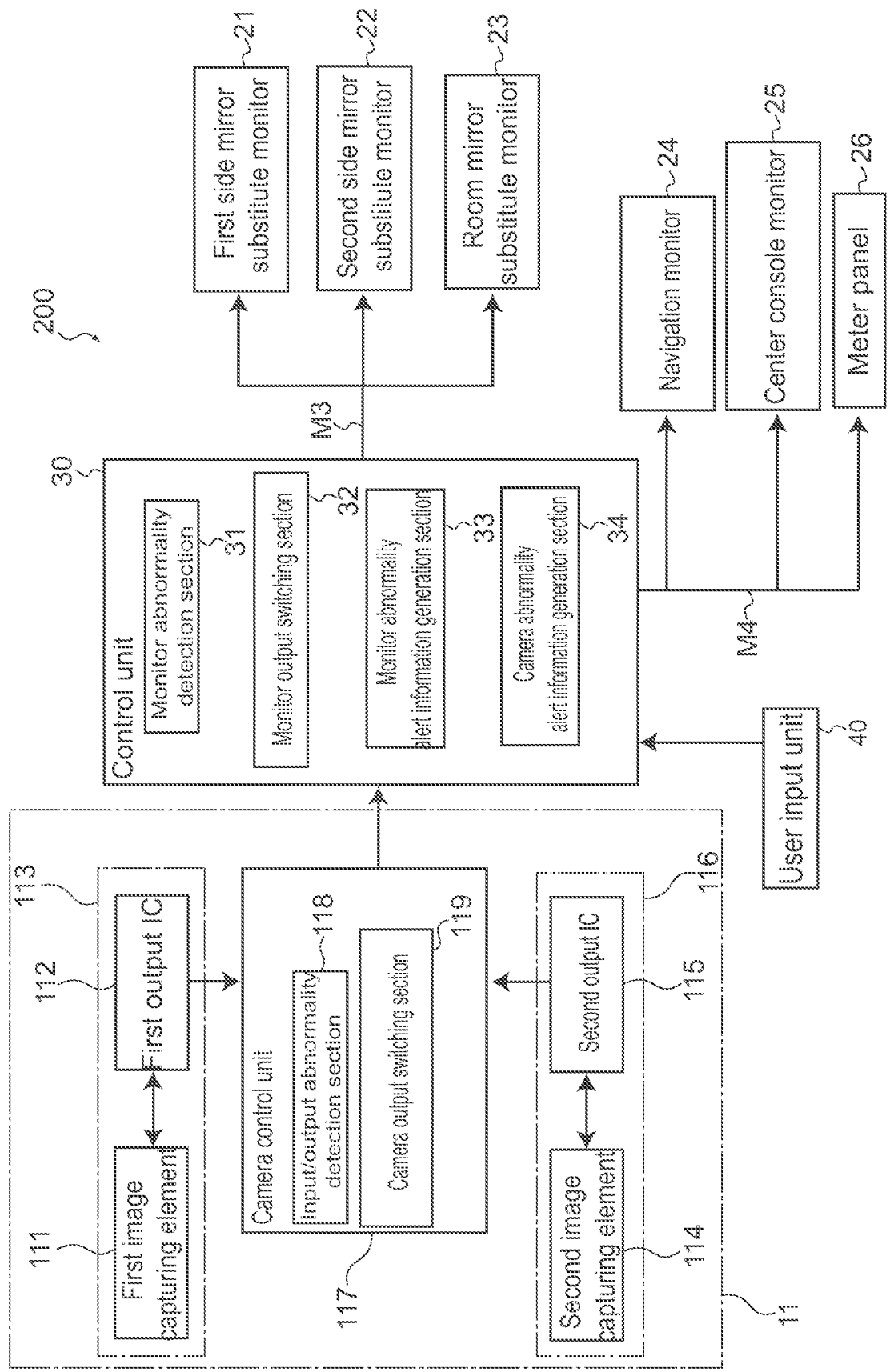
FIG. 6 is a function block diagram showing a configuration example of an in-vehicle information processing system according to a second embodiment of the present technology.

FIG. 6 is a function block diagram showing a configuration example of an in-vehicle information processing system 200 according to the present embodiment. Hereinafter, the same configurations as those of the first embodiment will be denoted by the same symbols, and their detailed descriptions will be omitted. In addition, a second side camera 12 and a rear camera 13 will not be shown in the figure. Note that the present embodiment will describe a case in which an image is acquired from a first side camera 11 as a representative example but is not limited to the case.

The in-vehicle information processing system 200 according to the present embodiment is different from the in-vehicle information processing system according to the first embodiment in that a control unit 30 includes a camera abnormality alert information generation section 34, and that the first side camera 11 includes first and second image capturing elements 111 and 114, first and second output ICs (Integrated Circuits) 112 and 115, and a camera control unit 117. Note that the second side camera 12 and the rear camera 13 can also have the same configurations as those of the first side camera 11 in the present embodiment.

The first image capturing element 111 is, for example, an image sensor such as a CCD (Charge Coupled Device) sensor and a CMOS (Complementary Metal Oxide Semiconductor) sensor. The first image capturing element 111 is configured to be capable of capturing an image of the rear side and the rear lateral side of an automobile 100 at a predetermined frame rate, and outputs the captured image to the first output IC 112. The first image capturing element 111 may be a back irradiation type image sensor or a laminated type image sensor in which a pixel portion and a logic portion are laminated together.

The first output IC 112 is configured to drive the first image capturing element 111 and output an image output from the first image capturing element 111 to the camera control unit 117.

In the present embodiment, a first input/output system 113 of the first side camera 11 is constituted by the first image capturing element 111 and the first output IC 112.

The second image capturing element 114 is an image sensor such as a CCD sensor and a CMOS sensor like the first image capturing element 111. The second image capturing element 114 is configured to be capable of capturing an image of the rear side and the rear lateral side of the automobile 100 at a predetermined frame rate, and outputs the captured image to the second output IC 115.

The second output IC 115 is configured to drive the second image capturing element 114 and output an image output from the second image capturing element 114 to the camera control unit 117.

In the present embodiment, a second input/output system 116 that has the function of supporting the first input/output system 113 is constituted by the second image capturing element 114 and the second output IC 115.

The camera control unit 117 according to the present embodiment is the controller of the first side camera 11, and configured to be capable of outputting images output from the first and second input/output systems 113 and 116 to the control unit 30.

As shown in FIG. 6, the camera control unit 117 includes an input/output abnormality detection section 118 and a camera output switching section 119. The camera control unit 117 is constituted by, for example, DSP (Digital Signal Processing), performs an operation program stored in a program area to realize functions as the input/output abnormality detection section 118 and the camera output switching section 119, and performs processing such as processing for controlling the entirety of the first side camera 11, processing for switching the input/output systems that will be described later, or the like.

On the basis of the abnormalities of the current values or the like of the first and second input/output systems 113 and 116, the input/output abnormality detection section 118 detects the presence or absence of the abnormalities. Specifically, the input/output abnormality detection section 118 is configured to be capable of detecting the abnormality of the first input/output system 113 and outputting a detection result to the camera abnormality alert information generation section 34 and the camera output switching section 119.

In addition, the input/output abnormality detection section 118 detects the presence or absence of the abnormality of the second input/output system 116. When detecting that the abnormality has occurred in the second input/output system 116, the input/output abnormality detection section 118 can stop (OFF) the output of an image from the first side camera 11.

On the basis of the detection result of the input/output abnormality detection section 118, the camera output switching section 119 is configured to be capable of switching the image input/output systems in the first side camera 11 from the first input/output system 113 to the second input/output system 116.

On the basis of the detection result of the input/output abnormality detection section 118, the camera abnormality alert information generation section 34 generates camera abnormality alert information informing the abnormality of the first side camera 11. In addition, the camera abnormality alert information generation section 34 is configured to be capable of outputting the generated camera abnormality alert information to any of a navigation monitor 24, a center console monitor 25, and a meter panel 26.

[Information Processing Method]

Figure 7:
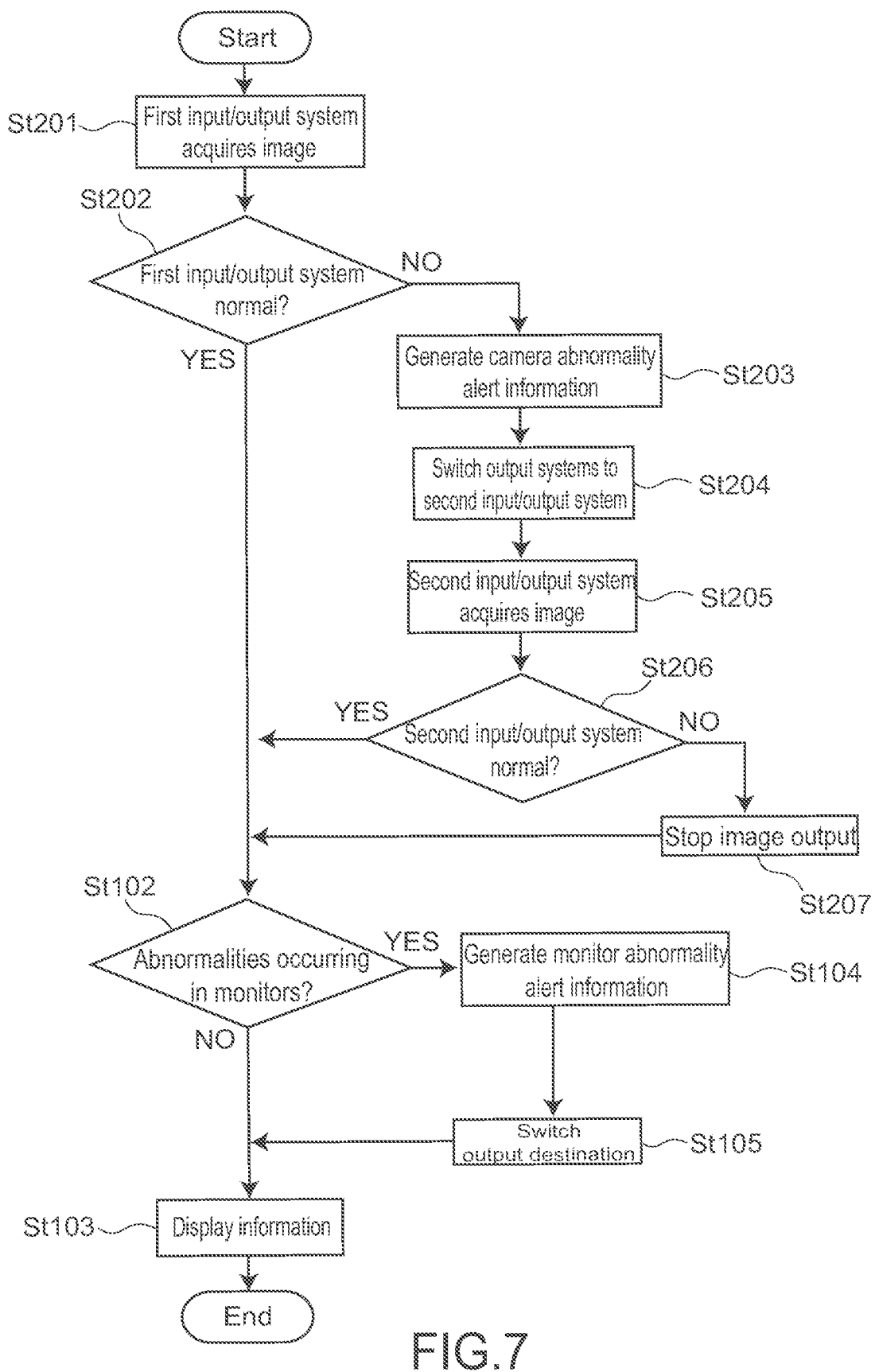
FIG. 7 is a flowchart showing an example of the information processing method of the in-vehicle information processing device according to the embodiment.

Next, the information processing method of the in-vehicle information processing system 200 according to the present embodiment will be described. FIG. 7 is a flowchart showing an example of the information processing method of the in-vehicle information processing system 200.

In the in-vehicle information processing system 200 according to the present embodiment, the control unit 30 performs control to switch from a "normal mode M1" to an "abnormality detection mode M2" described in the first embodiment, and the camera control unit 117 performs control to switch the input/output systems of the first side camera 11. Hereinafter, the information processing method of the in-vehicle information processing system 200 will be described with reference to FIG. 7.

(Normal Mode)

Control Example 1

First, in a normal mode M3 according to the present embodiment, the camera control unit 117 acquires an image from the first input/output system 113 (St201). Next, the input/output abnormality detection section 118 detects the presence or absence of the abnormality of the first input/output system 113 (St202).

Then, when the input/output abnormality detection section 118 does not detect the abnormality of the first input/output system 113 (YES in St202), the camera control unit 117 outputs the image output from the first input/output system 113 to the control unit 30. After that, the image is displayed on a first side mirror substitute monitor 21 via steps (NO in St102→St103) described in the first embodiment described above.

Next, other control examples (control examples 2 and 3) in the normal mode M3 according to the present embodiment will be described.

Control Example 2

First, like the control example 1, the camera control unit 117 acquires an image from the first input/output system 113 (St201), and the input/output abnormality detection section 118 detects the presence or absence of the abnormality of the first input/output system 113 (St202).

Then, when the input/output abnormality detection section 118 detects the abnormality of the first input/output system 113 (NO in St202), the input/output abnormality detection section 118 outputs the detection result to the camera output switching section 119 and the camera abnormality alert information generation section 34. Thus, the camera abnormality alert information generation section 34 generates camera abnormality alert information (St203), and the camera output switching section 119 switches the input/output systems from the first input/output system 113 to the second input/output system 116 (St204).

Next, the camera control unit 117 acquires an image from the second input/output system 116 instead of the first input/output system 113 (St205).

Then, the input/output abnormality detection section 118 detects the presence or absence of the abnormality of the second input/output system 116 (St206). When the input/output abnormality detection section 118 does not detect the abnormality (YES in St206), the camera control unit 117 outputs the image acquired from the second input/output system 116 to the control unit 30. After that, the control unit 30 performs the steps (NO in St102→St103) described in the first embodiment described above.

That is, in the control example 2, the input/output abnormality detection section 118 switches the image input/output systems of the first side camera 11 from the first input/output system 113 to the second input/output system 116, and the control unit 30 outputs the image acquired from the second input/output system 116 and the camera abnormality alert information to the first side mirror substitute monitor 21 (St201→NO in St202→St203→St204→St205→YES in St206→NO in St102→St103).

Thus, the image output from the second input/output system 116 and the camera abnormality alert information are displayed on the first side mirror substitute monitor 21 in an overlapped state.

Control Example 3

In the present control example 3, after the camera control unit 117 and the control unit 30 perform the above steps (St201→NO in St202→St203→St204→St205), the input output abnormality detection section 118 detects the abnormality of the second input/output system 116 (NO in St206) and stops (OFF) the output of the image of the first side camera 11 (St207). Next, the control unit 30 performs the steps (NO in St102→St103) in the first embodiment described above.

That is, in the present control example 3, the input/output abnormality detection section 118 detects the abnormalities of the first and second input/output systems 113 and 116 and stops the output of the image of the first side camera 11, and the control unit 30 outputs only the camera abnormality alert information to the first side mirror substitute monitor 21 (St201→NO in St202→St203→St204, →St205→NO in St206→St207→NO in St102→St103).

Thus, only the camera abnormality alert information is displayed on the first side mirror substitute monitor 21.

(Abnormality Detection Mode)

Next, an abnormality detection mode M4 (control examples 4 to 6) according to the present embodiment will be described.

Control Example 4

In the present control example 4, the camera control unit 117 performs the above steps (St201→YES in St202), and the control unit 30 performs the steps (YES in St102→St104→St105→St103) in the first embodiment described above.

That is, in the present control example 4, when the monitor abnormality detection section 31 detects the abnormality of the first side mirror substitute monitor 21, a monitor output switching section 32 switches image output systems in the in-vehicle information processing system 200, and the control unit 30 outputs an image acquired from the first input/output system 113 and monitor abnormality alert display information to any of the navigation monitor 24, the center console monitor 25, and the meter panel 26 (St201→YES in St202→YES in St102→St104→5105→St103).

Thus, the image output from the first input/output system 113 and the monitor abnormality alert information are displayed on any of the navigation monitor 24, the center console monitor 25, and the meter panel 26 in an overlapped state.

Control Example 5

In the present control example 5, the camera control unit 117 and the control unit 30 perform the above steps (St201→NO in St202→St203→St204→St205→YES in St206) and the steps (Yes in St102→St104→St105→St103) in the first embodiment described above.

That is, in the present control example 5, the input/output abnormality detection section 118 switches the image input/output systems of the first side camera 11 from the first input/output system 113 to the second input/output system 116, and the control unit 30 outputs an image output from the second input/output system 116, camera abnormality alert information, and monitor abnormality alert information to any of the navigation monitor 24, the center console monitor 25, and the meter panel 26 (St201→NO in St202→St203→St204→St205→YES in St206→YES in St102→St104→St105→St103).

Thus, the image output from the second input/output system 116, the camera abnormality alert information, and the monitor abnormality alert information are displayed on any of the navigation monitor 24, the center console monitor 25, and the meter panel 26 in an overlapped state.

Control Example 6

In the present control example 6, the camera control unit 117 and the control unit 30 perform the above steps (St201→NO in St202→St203→St204→St205→NO in St206→St207) and the steps (YES in St102→St104→St105→St103) in the first embodiment described above.

That is, in the present control example 6, the input/output abnormality detection section 118 detects the abnormalities of the first and second input/output systems 113 and 116 and stops the output of the image of the first side camera 11, and the control unit 30 outputs camera abnormality alert information and monitor abnormality alert information to any of the navigation monitor 24, the center console monitor 25, and the meter panel 26 (St201→NO in St202→St203→St204→St205→NO in St206→St207→YES in St102→St104→St105→St103).

Thus, the camera abnormality alert information and the monitor abnormality alert information are displayed on any of the navigation monitor 24, the center console monitor 25, and the meter panel 26 in an overlapped state.

[Operation of In-Vehicle Information Processing System]

The in-vehicle information processing system 200 according to the present embodiment is so configured that the first side camera 11 includes the first input/output system 113 and the second input/output system 116 having the function of supporting the first input/output system 113.

Accordingly, even if an abnormality occurs in the first input/output system 113, it becomes possible to capture an image of the rear side and the rear lateral side of a vehicle with the second input/output system 116 instead of the first input/output system 113. Therefore, the reliability of a camera in capturing an image of the rear side and the rear lateral side of a vehicle can be improved.

In addition, according to the present embodiment, not only an image captured by the first side camera 11 and monitor abnormality alert information but also camera abnormality alert information can be displayed on a monitor (any of the navigation monitor 24, the center console monitor 25, and the meter panel 26) other than monitors substituting for rear view mirrors in an overlapped state.

Thus, it becomes possible to effectively alert a user to the occurrence of an abnormality in a camera to urge the early replacement of the camera and prevent the prolongation of a state in which abnormalities have occurred not only in the monitor but also in the camera.

[Alert Display]

Figure 8:
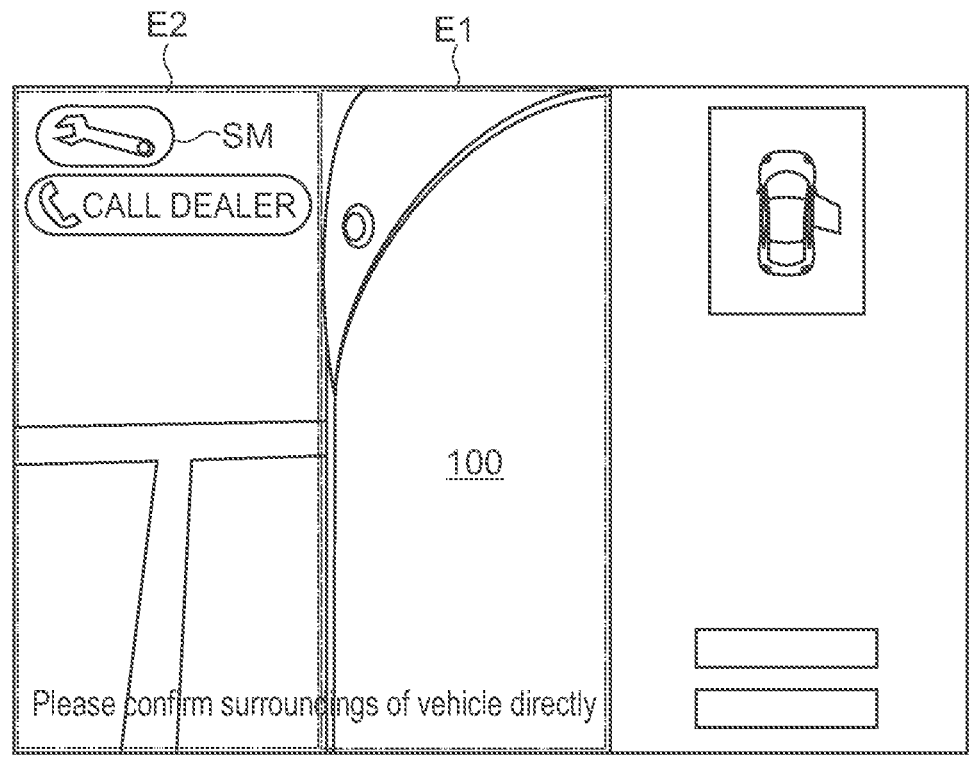
FIG. 8 is a schematic view showing an example of an image displayed on a monitor in a case in which abnormalities occur in a camera and a monitor according to the present technology.

FIG. 8 is a schematic view showing an example of an image displayed on a monitor in a case in which abnormalities occur in a camera and a monitor according to the present technology.

According to the present technology, the navigation monitor 24, the center console monitor 25, and the meter panel 26 convert alert information output from the monitor abnormality alert information generation section 33 and the camera abnormality alert information generation section 34 into text information such as "CALL DEALER" or a symbol mark SM as shown in FIG. 8 to be displayed thereon.

Here, as shown in FIG. 8, the above monitors have a first image capturing region E1 in which the outer shape of the automobile 100 (a part of the automobile 100) is displayed and a second image capturing region E2 in which an outside of the vehicle other than the part of the automobile 100 is displayed, and the text information or the symbol mark SM is displayed in the second image capturing region E2.

Thus, it becomes possible to improve the visibility of alert information for the user. In addition, the above monitors 24, 25, and 26 can appropriately change and display the arrangement of the above text information or the symbol mark SM according to the field angle (region area) of the second image capturing region E2. Note that the above alert information is displayed at all times typically when the user starts or resumes driving but may be set so as not to be displayed.

The type of the symbol mark SM is not particularly limited, but a universal mark (mark not including texts) adaptable to the users of various nationalities or a symbol mark imitating a spanner or a hammer as shown in FIG. 8 can be used, for example.

Third Embodiment

Figure 9:
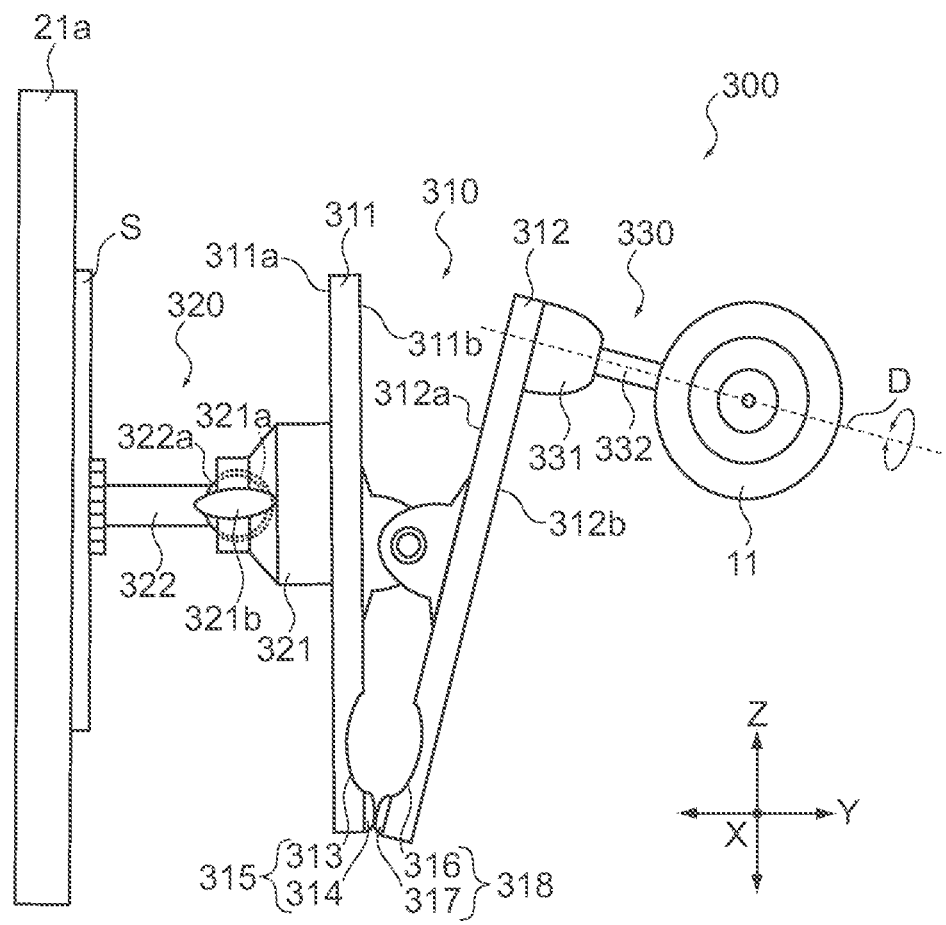
FIG. 9 is a schematic view showing a configuration example of a camera monitor system according to a third embodiment of the present technology.

FIG. 9 is a schematic view showing the configuration of a camera monitor system 300 according to the present embodiment. Hereinafter, the same configurations as those of the first embodiment will be denoted by the same symbols and their detailed descriptions will be omitted.

The present embodiment is different from the above embodiments in that a temporary monitor 21a configured to be capable of displaying control information (images, monitor abnormality alert information, camera abnormality alert information, or the like) output from a control unit 30 like a first side mirror substitute monitor 21 and a first side camera 11 are supported by a common support member, and that the temporary monitor 21a and the first side camera 11 are capable of constituting the camera monitor system 300 in pairs. Note that a second side camera 12 and a rear camera 13 can also configure the same system as the camera monitor system 300 in the present embodiment. In addition, the configuration of the camera monitor system 300 is not limited to a configuration shown in FIG. 9.

[Configuration of Camera Monitor System]

As shown in FIG. 9, the camera monitor system 300 according to the present embodiment includes a support member 310 and first and second joint parts 320 and 330.

(Support Member)

The support member 310 is a spring-fixation type (pinch type) clip, and includes first and second plate-shaped members 311 and 312 as shown in FIG. 9.

The first plate-shaped member 311 includes first and second principal surfaces 311a and 311b as shown in FIG. 9. The first joint part 320 is provided on the first principal surface 311a, and a first sandwiching part 315 is provided at the end of the second principal surface 311b.

As shown in FIG. 9, the first sandwiching part 315 is constituted by a first protrusion part 314 provided at the end of the first plate-shaped member 311 and a first recess part 313 provided adjacent to the first protrusion part 314.

As shown in FIG. 9, the second plate-shaped member 312 includes third and fourth principal surfaces 312a and 312b. A second sandwiching part 318 is provided at the end of the third principal surface 312a, and the second joint part 330 is provided on the fourth principal surface 312b.

As shown in FIG. 9, the second sandwiching part 318 is constituted by a second protrusion part 317 provided at the end of the second plate-shaped member 312 and a second recess part 316 provided adjacent to the second protrusion part 317. The camera monitor system 300 has the function of sandwiching an object to be sandwiched with the first protrusion part 314 and the second protrusion part 317 or with the first recess part 313 and the second recess part 316.

A material constituting the first and second protrusion parts 314 and 317 is not particularly limited, but the first and second protrusion parts 314 and 317 can be made of, for example, polybutadiene-based, nitryl-based, or chloroprene-based synthetic rubber. In addition, the rubber may be coated on the surfaces of the first and second recess parts 313 and 316 in the present embodiment. Thus, a scratch or the like on a place at which the camera monitor system 300 is attached is prevented.

The support member 310 according to the present embodiment is not limited to a pinch type clip as shown in FIG. 9 but may be, for example, one such as a blade spring type clip that is clamp-adjusted by a screw or the like to be fixed.

(First Joint Part)

As shown in FIG. 9, the first joint part 320 includes a socket 321 and a first relay member 322. The first joint part 320 according to the present embodiment is so-called a free pan head of a pivot type. As shown in the figure, the socket 321 includes a substantially spherical accommodation part 321a and a first fastening knob 321b inserted into the socket 321.

As shown in FIG. 9, one end of the first relay member 322 is connected to a stay S fixed to the back surface (surface on a side opposite to an image display surface) of the temporary monitor 21a by a screw or the like (not shown), and the other end thereof is provided with a spherical member 322a.

As shown in FIG. 9, the spherical member 322a is accommodated so as not to be detachable with a predetermined gap inside the accommodation part 321a of the socket 321. Thus, the temporary monitor 21a is made rotatable about at least a Y-axis around the spherical member 322a via the stay S and the first relay member 322 (see FIG. 10). In addition, the spherical member 322a can be fixed inside the accommodation part 321a by the first fastening knob 321b.

Note that the above "pivot joint" refers to the joint between two mechanical elements and indicates that one element generally changes its position in an angle direction with respect to the other element. In addition, the pivot joint may include, for example, a ball joint, a universal joint (coupling), or the like.

(Second Joint Part)

As shown in FIG. 9, the second joint part 330 includes a seat 331 and a second relay member 332. As shown in the figure, one end of the second relay member 332 is connected to the seat 331, and the other end thereof is connected to the first side camera 11.

Here, as shown in FIG. 9, the second relay member 332 according to the present embodiment is configured to be rotatable about a D-axis orthogonal to the longitudinal direction of the second plate-shaped member 312. Thus, the first side camera 11 is also made rotatable about the D-axis. Note that the second joint part 330 may employ a pivot joint system like the first joint part 320 in the present embodiment.

[Operation of Camera Monitor System]

Figure 10:
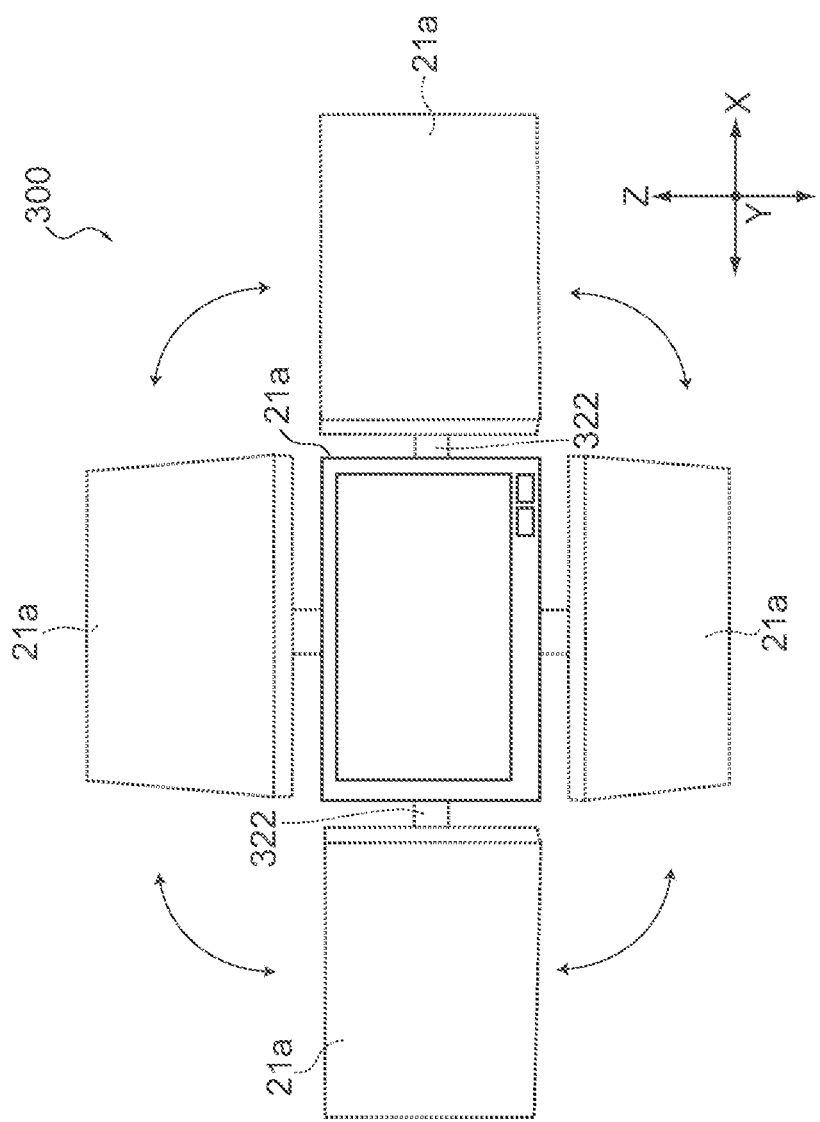
FIG. 10 is a schematic view showing the operation of a monitor according to the camera monitor system.

FIG. 10 is a schematic view showing the operation of the temporary monitor 21a of the camera monitor system 300. As shown in FIGS. 9 and 10, the temporary monitor 21a is configured to be rotatable about at least the Y-axis while being supported by the support member 310 via the first joint part 320, and the spherical member 322a is fixed inside the accommodation part 321a by the first fastening knob 321b.

Thus, a user can fix the temporary monitor 21a at a desired position (angle), and confirm an image displayed on the temporary monitor 21a regardless of a place at which the camera monitor system 300 is installed. That is, the camera monitor system 300 is capable of functioning like an input/output system constituted by the first side camera 11 and any of the monitor 24, 25, and 26 other than the monitors substituting for the rear view mirrors.

Accordingly, in the present embodiment, it is possible to provide the camera monitor system 300 constituted by the temporary monitor 21a and the first side camera 11. Therefore, even if an abnormality occurs in any of the monitor 24, 25, and 26 that serve as new output destinations in "abnormality detection modes M2 and M4" in the above embodiments and the display of an image on the monitor is, for example, not allowed, it becomes possible for the user to have the temporary substitute means until the monitor is replaced with a new monitor and reliably confirm an image of the rear side and the rear lateral side of a vehicle captured by the first side camera 11.

Note that the camera monitor system 300 is not limited to a configuration including the first side camera 11 and the temporary monitor 21a, but may be constituted by the first side mirror substitute monitor 21 and a temporary camera that captures an image of the rear side and the rear lateral side of a vehicle 100 and outputs the picked-up image to the control unit 30 like the first side camera 11.

Thus, even if an abnormality occurs in the first side camera 11 and the capturing of an image is not, for example, allowed, it becomes possible for the user to have temporary substitute means until the first side camera 11 with the abnormality is replaced with a new camera and reliably confirm an image of the rear side and the rear lateral side of a vehicle. Note that besides the first side mirror substitute monitor 21, a second side mirror substitute monitor 22 and a room mirror substitute monitor 23 can also configure the same system as the camera monitor system 300 in the present embodiment.

In addition, a place at which the camera monitor system 300 is attached is typically a side window of the vehicle 100, but is not particularly limited so long as the camera monitor system 300 is attachable by the first and second sandwiching parts 315 and 318. In addition, the temporary monitor 21a and the first side camera 11 are integrated with each other as an example but may be a separate type in which the temporary monitor 21a and the first side camera 11 are separated from each other. Moreover, a configuration in which a general-purpose smart phone or the like is connected as a monitor may be employed.

Modified Examples

The embodiments of the present technology are described above. However, the present technology is not limited to the embodiments described above, and various modifications are, of course, added to the embodiments without departing from the spirit of the present technology.

For example, the in-vehicle information processing systems 10 and 200 according to the above embodiments are so configured that images output from the plurality of cameras 11, 12, and 13 are output to the common control unit 30, but may be so configured that the control unit 30 separately corresponds to each of the plurality of cameras 11, 12, and 13.

In addition, in the abnormality detection modes M2 and M4 according to the above embodiments, any of the monitors 24, 25, and 26 other than the monitors substituting for the rear view mirrors serves as a new output destination when an abnormality occurs in any of the monitors 21, 22, and 23 substituting for the rear view mirrors. However, the input/output systems of the in-vehicle information processing systems 10 and 200 may be switched between the monitors 21, 22, and 23 substituting for the rear view mirrors. In this case, for example, the two-screen display of images captured by the plurality of cameras 11, 12, and 13 is performed on any of the monitors 21, 22, and 23 serving as new output destinations.

In addition, the camera abnormality alert information generation section 34 according to the above embodiment may generate camera abnormality alert information on the basis of not only the abnormalities of the input/output systems of the plurality of cameras 11, 12, and 13 but also the abnormality (uncalibration, an image capturing malfunction, or the like) of the temporary camera described in the third embodiment.

In addition, the monitors other than monitors substituting for the rear view mirrors in the abnormality detection modes M2 and M4 according to the above embodiments are not limited to the navigation monitor 24, the center console monitor 25, and the meter panel 26, but an HUD (Head-Up Display), a rear monitor, a flip down monitor, a headrest monitor, a sun visor monitor, or the like may be employed as a new output destination in the abnormality detection modes M2 and M4. Particularly, in the case of a monitor like a rear monitor installed at a place not suitable for a driver's visual recognition in its normal use, it is desirable that the monitor be freely attachable/detachable to/from a vehicle.

In addition, a vehicle to which the in-vehicle information processing systems 10 and 200 and the camera monitor system 300 in the present technology are applicable is not limited to a passenger vehicle like the automobile 100 but is applicable to a large passenger vehicle or the like such as a motorcycle and a bus.

Note that the present technology may also employ the following configurations.

(1) An in-vehicle information processing device including:
a control unit that detects presence or absence of an abnormality of a first monitor that displays a first image captured by a first camera among a plurality of cameras that capture an image of a predetermined region including a rear side of a vehicle, and switches, when detecting the abnormality of the first monitor, from a first mode in which the first image is displayed on the first monitor to a second mode in which the first image is displayed on a second monitor different from the first monitor.

(2) The in-vehicle information processing device according to (1), in which
the control unit further generates monitor abnormality alert information informing the abnormality of the first monitor.

(3) The in-vehicle information processing device according to (1) or (2), in which
the control unit further generates camera abnormality alert information on the basis of an abnormality of the first camera, the camera abnormality alert information informing the abnormality of the first camera on the first monitor in the first mode and informing the abnormality of the first camera on the second monitor in the second mode.

(4) The in-vehicle information processing device according to any one of (1) to (3), in which
the control unit switches from the first mode to the second mode on the basis of an input operation by a user.

(5) An in-vehicle information processing system including:
a plurality of cameras that capture an image of a predetermined region including a rear side of a vehicle;
a plurality of monitors that display images captured by the plurality of cameras; and
a control unit that detects presence or absence of an abnormality of a first monitor that displays a first image captured by a first camera among the plurality of cameras, and switches, when detecting the abnormality of the first monitor, from a first mode in which the first image is displayed on the first monitor to a second mode in which the first image is displayed on a second monitor different from the first monitor.

(6) The in-vehicle information processing system according to (5), in which
the first camera has
first and second input/output systems that capture the image of the predetermined region including the rear side of the vehicle, and
a camera control unit including an input/output abnormality detection section that detects an abnormality of the first input/output system and a camera output switching section that switches image input/output systems of the first camera from the first input/output system to the second input/output system.

(7) The in-vehicle information processing system according to (5) or (6), in which
the control unit generates monitor abnormality alert information and camera abnormality alert information, the monitor abnormality alert information informing the abnormality of the first monitor on the second monitor in the second mode, the camera abnormality alert information informing an abnormality of the first camera on the second monitor in the second mode on the basis of the abnormality of the first camera, and
the plurality of monitors display the monitor abnormality alert information and the camera abnormality alert information as a symbol mark.

(8) The in-vehicle information processing system according to (7), in which
the plurality of monitors include a first image capturing region in which a part of the vehicle is displayed and a second image capturing region in which an outside of the vehicle other than the part of the vehicle is displayed, and display the symbol mark in the second image capturing region.

(9) The in-vehicle information processing system according to (7) or (8), in which
the symbol mark is a mark that does not include a text.

(10) The in-vehicle information processing system according to any one of (5) to (9), further including:
a support member that is provided to be freely attachable/detachable to/from a vehicle body, supports the first camera and the first monitor, and has a joint connected to the first monitor, in which
the first monitor is configured to be freely rotatable about at least an axis around the joint.

(11) The in-vehicle information processing system according to any one of (5) to (10), further including:
a user input unit that causes the control unit to switch from the first mode to the second mode on the basis of an input operation by a user.

(12) The in-vehicle information processing system according to any one of (5) to (11), in which
the second monitor is any of a room mirror substitute monitor, a side mirror substitute monitor, a navigation monitor, a center console monitor, and a meter panel.

(13) An information processing method including:
detecting presence or absence of an abnormality of a first monitor that displays a first image captured by a first camera among a plurality of cameras that capture an image of a predetermined region including a rear side of a vehicle; and
switching, when detecting the abnormality of the first monitor, from a first mode in which the first image is displayed on the first monitor to a second mode in which the first image is displayed on a second monitor different from the first monitor.

(14) A program that causes the in-vehicle information processing device according to any one of (1) to (4) to perform:

a step of detecting presence or absence of an abnormality of a first monitor that displays a first image captured by a first camera among a plurality of cameras that capture an image of a predetermined region including a rear side of a vehicle; and a step of switching, when detecting the abnormality of the first monitor, from a first mode in which the first image is displayed on the first monitor to a second mode in which the first image is displayed on a second monitor different from the first monitor.

REFERENCE SIGNS LIST 10 in-vehicle information processing device
11 first side camera
12 second side camera
13 rear camera
21 first side mirror substitute monitor
21a temporary monitor
22 second side mirror substitute monitor
23 room mirror substitute monitor
24 navigation monitor
25 center console monitor
26 meter panel
30 control unit
31 monitor abnormality detection section
32 monitor output switching section
33 monitor abnormality alert information generation section
34 camera abnormality alert information generation section
40 user input unit
111 first image capturing element
112 first output IC
113 first input/output system
114 second image capturing element
115 second output IC
116 second input/output system
300 camera monitor system
310 support member
320 first joint part
330 second joint part

The invention claimed is:

1. An in-vehicle information processing device, comprising:
a control unit configured to:
generate camera abnormality alert information based on an abnormality of a first input/output system of a first camera of a plurality of cameras, wherein the plurality of cameras captures a plurality of images of a specific region including a rear side of a vehicle;
detect an abnormality of a first monitor that displays a first image of the plurality of images, wherein the first image is captured by a second input/output system of the first camera;
generate monitor abnormality alert information based on the detection of the abnormality of the first monitor; and
switch, based on the detection of the abnormality of the first monitor, from a first mode in which the first image is displayed on the first monitor to a second mode, wherein
a part of the vehicle is displayed in a first image capturing region of a second monitor in the second mode,
a second image of the plurality of images, the camera abnormality alert information, and the monitor abnormality alert information are displayed in an overlapped state in a second image capturing region of the second monitor in the second mode,
the second monitor is different from the first monitor,
the second image is captured by the second input/output system of the first camera,
the monitor abnormality alert information and the camera abnormality alert information are displayed as a symbol mark, and
the second image corresponds to an outside of the vehicle.

2. The in-vehicle information processing device according to claim 1, wherein the monitor abnormality alert information indicates the abnormality of the first monitor.

3. The in-vehicle information processing device according to claim 1, wherein the camera abnormality alert information indicates the abnormality of the first input/output system of the first camera on the first monitor in the first mode and the abnormality of the first input/output system of the first camera on the second monitor in the second mode.

4. The in-vehicle information processing device according to claim 1, wherein the control unit is further configured to switch from the first mode to the second mode based on a user input.

5. An in-vehicle information processing system, comprising:
a plurality of cameras configured to capture a plurality of images of a specific region that includes a rear side of a vehicle;
a plurality of monitors configured to display the plurality of images captured by the plurality of cameras, wherein
each of the plurality of monitors includes a first image capturing region and a second image capturing region, and
the plurality of monitors includes a first monitor and a second monitor; and
a control unit configured to:
generate camera abnormality alert information based on an abnormality of a first input/output system of a first camera of the plurality of cameras;
detect an abnormality of the first monitor that displays a first image of the plurality of images, wherein the first image is captured by a second input/output system of the first camera;
generate monitor abnormality alert information based on the detection of the abnormality of the first monitor; and
switch, based on the detection of the abnormality of the first monitor, from a first mode to a second mode, wherein
the first monitor is configured to display the first image in the first mode,
the second monitor is configured to:
display a part of the vehicle in the first image capturing region in the second mode; and
display, in an overlapped state, a second image of the plurality of images, the monitor abnormality alert information, and the camera abnormality alert information in the second image capturing region in the second mode,
the second image is captured by the second input/output system of the first camera,
the monitor abnormality alert information and the camera abnormality alert information are displayed as a symbol mark, and
the second image corresponds to an outside of the vehicle.

6. The in-vehicle information processing system according to claim 5, wherein
the first camera includes the first input/output system, the second input/output system, an input/output abnormality detection section, and a camera output switching section,
the input/output abnormality detection section is configured to detect the abnormality of the first input/output system, and
the camera output switching section is configured to switch, based on the detection of the abnormality of the first input/output system, from the first input/output system to the second input/output system.

7. The in-vehicle information processing system according to claim 5, wherein
the monitor abnormality alert information indicates the abnormality of the first monitor on the second monitor in the second mode, and
the camera abnormality alert information indicates the abnormality of the first input/output system of the first camera on the second monitor in the second mode based on the abnormality of the first input/output system of the first camera.

8. The in-vehicle information processing system according to claim 5, wherein the symbol mark is a mark that does not include a text.

9. The in-vehicle information processing system according to claim 5, further comprising a support member that is removably attachable to a body of the vehicle, wherein
the support member is configured to support the first camera and the first monitor,
the support member has a joint connected to the first monitor, and
the first monitor is configured to freely rotate about at least an axis around the joint.

10. The in-vehicle information processing system according to claim 5, further comprising a user input unit that is configured to control, based on a user input, the control unit to switch from the first mode to the second mode.

11. The in-vehicle information processing system according to claim 5, wherein the second monitor is one of a room mirror substitute monitor, a side mirror substitute monitor, a navigation monitor, a center console monitor, or a meter panel.

12. An information processing method, comprising:
generating camera abnormality alert information based on an abnormality of a first input/output system of a first camera of a plurality of cameras, wherein the plurality of cameras captures a plurality of images of a specific region including a rear side of a vehicle;
detecting an abnormality of a first monitor that displays a first image of the plurality of images, wherein the first image is captured by a second input/output system of the first camera;
generating monitor abnormality alert information based on the detection of the abnormality of the first monitor; and
switching, based on the detection of the abnormality of the first monitor, from a first mode in which the first image is displayed on the first monitor to a second mode, wherein
a part of the vehicle is displayed in a first image capturing region of a second monitor in the second mode,
a second image of the plurality of images, the camera abnormality alert information, and the monitor abnormality alert information are displayed in an overlapped state in a second image capturing region of the second monitor in the second mode,
the second monitor is different from the first monitor,
the second image is captured by the second input/output system of the first camera,
the monitor abnormality alert information and the camera abnormality alert information are displayed as a symbol mark, and
the second image corresponds to an outside of the vehicle.

13. A non-transitory computer-readable medium having stored thereon computer-executable instructions which, when executed by a control unit of an in-vehicle information processing device, cause the control unit to execute operations, the operations comprising:
generating camera abnormality alert information based on an abnormality of a first input/output system of a first camera of a plurality of cameras, wherein the plurality of cameras captures a plurality of images of a specific region including a rear side of a vehicle;
detecting an abnormality of a first monitor that displays a first image of the plurality of images, wherein the first image is captured by a second input/output system of the first camera;
generating monitor abnormality alert information based on the detection of the abnormality of the first monitor; and
switching, based on the detection of the abnormality of the first monitor, from a first mode in which the first image is displayed on the first monitor to a second mode, wherein
a part of the vehicle is displayed in a first image capturing region of a second monitor in the second mode,
a second image of the plurality of images, the camera abnormality alert information, and the monitor abnormality alert information are displayed in an overlapped state in a second image capturing region of the second monitor in the second mode,
the second monitor is different from the first monitor,
the second image is captured by the second input/output system of the first camera,
the monitor abnormality alert information and the camera abnormality alert information are displayed as a symbol mark, and
the second image corresponds to an outside of the vehicle.

14. An in-vehicle information processing system, comprising:
a plurality of cameras configured to capture a plurality of images of a specific region that includes a rear side of a vehicle;
a plurality of monitors configured to display the plurality of images captured by the plurality of cameras, wherein
each of the plurality of monitors includes a first image capturing region and a second image capturing region, and
the plurality of monitors includes a first monitor and a second monitor; and
a control unit configured to:
generate camera abnormality alert information based on an abnormality of a first input/output system of a first camera of the plurality of cameras;
detect an abnormality of the first monitor that displays a first image of the plurality of images, wherein the first image is captured by a second input/output system of the first camera;

generate monitor abnormality alert information based on the detection of the abnormality of the first monitor; and switch, based on the detection of the abnormality of the first monitor, from a first mode to a second mode, wherein the first monitor is configured to display the first image in the first mode, the monitor abnormality alert information indicates the abnormality of the first monitor on the second monitor in the second mode, the camera abnormality alert information indicates the abnormality of the first input/output system of the first camera on the second monitor in the second mode based on the abnormality of the first input/output system of the first camera, the second monitor is configured to:
 display a part of the vehicle in the first image capturing region in the second mode; and
 display, in an overlapped state, a second image of the plurality of images, the monitor abnormality alert information, and the camera abnormality alert information in the second image capturing region in the second mode, the second image is captured by the second input/output system of the first camera, the monitor abnormality alert information and the camera abnormality alert information are displayed as a symbol mark, and the second image corresponds to an outside of the vehicle.

\* \* \* \* \*